(12) United States Patent
Boyd et al.

(10) Patent No.: US 10,442,544 B2
(45) Date of Patent: Oct. 15, 2019

(54) ENGINE DEGRADATION MANAGEMENT VIA MULTI-ENGINE MECHANICAL POWER CONTROL

(71) Applicants: Rolls-Royce North American Technologies, Inc., Indianapolis, IN (US); Bell Helicopter Textron Inc., Fort Worth, TX (US)

(72) Inventors: Douglas Boyd, Indianapolis, IN (US); Brian Tucker, Fort Worth, TX (US)

(73) Assignees: Rolls-Royce North American Technologies, Inc., Indianapolis, IN (US); Bell Helicopter Textron Inc., Fort Worth, TX (US)

( * ) Notice: Subject to any disclaimer, the term of this patent is extended or adjusted under 35 U.S.C. 154(b) by 124 days.

(21) Appl. No.: 15/586,136

(22) Filed: May 3, 2017

(65) Prior Publication Data
US 2017/0320586 A1 Nov. 9, 2017

Related U.S. Application Data

(60) Provisional application No. 62/333,747, filed on May 9, 2016.

(51) Int. Cl.
*B64D 31/06* (2006.01)
*B64D 45/00* (2006.01)

(52) U.S. Cl.
CPC ...... *B64D 31/06* (2013.01); *B64D 2045/0085* (2013.01)

(58) Field of Classification Search
CPC .......... B64D 31/06; B64D 2045/0085
See application file for complete search history.

(56) References Cited

U.S. PATENT DOCUMENTS 4,057,714 A * 11/1977 Fork .............. F01D 21/00
702/34
4,258,545 A 3/1981 Slater
(Continued)

FOREIGN PATENT DOCUMENTS

| EP | 2727838 A2 | 5/2014 |
| EP | 2851759 A1 | 3/2015 |
| EP | 2889711 A2 | 7/2015 |

OTHER PUBLICATIONS

Litt et al., "A Survey of Intelligent Control and Health Management Technologies for Aircraft Propulsion Systems", NASA, U.S. Army Research Laboratory, May 2005, 28 pgs.
(Continued)

*Primary Examiner* — Abby Y Lin
*Assistant Examiner* — Donald J Wallace
(74) *Attorney, Agent, or Firm* — Shumaker & Sieffert, P.A.

(57) ABSTRACT

A multi-engine power system is described that includes at least a first engine and a second engine configured to jointly provided mechanical power to the multi-engine power system. The multi-engine power system further includes a controller configured to estimate a deterioration factor of the first engine. The controller is further configured to adjust, based on the deterioration factor of the first engine, a first amount of mechanical power being provided by the first engine to increase a service time of the first engine, and adjust, based on the first amount of mechanical power being provided by the first engine, a second amount of mechanical power being provided by the second engine to compensate for the adjustment to the first amount of mechanical power.

18 Claims, 3 Drawing Sheets

(56) References Cited

U.S. PATENT DOCUMENTS

| | | | |
|---|---|---|---|
| 5,048,285 A | 9/1991 | Schmitt et al. | |
| 5,054,716 A * | 10/1991 | Wilson | B64C 29/0033 |
| | | | 244/56 |
| 6,542,853 B1 * | 4/2003 | Murakami | F02B 77/08 |
| | | | 123/179.15 |
| 7,870,915 B2 | 1/2011 | Beeson et al. | |
| 7,908,911 B2 | 3/2011 | Renner et al. | |
| 8,464,526 B2 | 6/2013 | Renner | |
| 8,627,797 B2 | 1/2014 | Renner | |
| 8,893,679 B2 | 11/2014 | Renner | |
| 9,206,780 B2 | 12/2015 | Renner | |
| 9,505,394 B2 | 11/2016 | Falkenstein | |
| 2008/0097703 A1 * | 4/2008 | Francois | F02C 9/00 |
| | | | 702/34 |
| 2008/0122195 A1 | 5/2008 | Beeson et al. | |
| 2009/0194067 A1 | 8/2009 | Peotter et al. | |
| 2010/0199655 A1 | 8/2010 | Renner | |
| 2010/0204931 A1 * | 8/2010 | Ling | G05B 23/0254 |
| | | | 702/41 |
| 2010/0280730 A1 * | 11/2010 | Page | F02C 9/28 |
| | | | 701/100 |
| 2010/0318283 A1 | 12/2010 | Renner | |
| 2012/0138405 A1 | 6/2012 | Falkenstein | |
| 2013/0024179 A1 * | 1/2013 | Mazzaro | G06Q 10/04 |
| | | | 703/18 |
| 2014/0129118 A1 | 5/2014 | Renner | |
| 2015/0073684 A1 | 3/2015 | Renner | |
| 2015/0081193 A1 * | 3/2015 | Gordon | F02C 9/28 |
| | | | 701/100 |
| 2015/0106313 A1 * | 4/2015 | Eklund | G06N 3/02 |
| | | | 706/21 |
| 2015/0185111 A1 | 7/2015 | Armstrong et al. | |
| 2015/0369138 A1 | 12/2015 | Phillips et al. | |
| 2017/0324360 A1 * | 11/2017 | Cline | F01D 15/10 |
| 2018/0126972 A1 * | 5/2018 | Bozsik | B60T 17/004 |
| 2018/0216566 A1 * | 8/2018 | Taxon | F02D 41/3854 |

OTHER PUBLICATIONS

Behbahani et al., "A Feasibility Study of Life-Extending Controls for Aircraft Turbine Engines Using a Generic Air Force Model", Proceedings of GT2006 ASME Turbo Expo 2006, May 8-11, 2006, 9 pgs.

U.S. Appl. No. 15/441,280, filed Feb. 24, 2017 by Curtis Harvey Cline et al.

Notice of Allowance from U.S. Appl. No. 15/441,280, dated Apr. 2, 2018, 11 pp.

* cited by examiner

ENGINE DEGRADATION MANAGEMENT VIA MULTI-ENGINE MECHANICAL POWER CONTROL

This application claims the benefit of U.S. Provisional Application No. 62/333,747 filed May 9, 2016, which is incorporated herein by reference in its entirety.

TECHNICAL FIELD

The disclosure relates to techniques for mechanical power management in multi-engine systems.

BACKGROUND

Some systems rely on multiple engines for producing mechanical power. For example, many aircraft (e.g., fixed-wing, rotorcraft, tilt-rotorcraft, etc.) rely on two or more engines to produce thrust. Mechanical deterioration and operational stresses endured by mechanical components of an engine may cause performance of that engine to degrade over time. Even if a multi-engine system commands each engine to provide approximately the same amount of mechanical power, each engine is inherently unique and may degrade at a different rate.

Eventually an engine may degrade to its respective end-of-life. Although other engines of the system may still possess useful life, a system may need to be taken offline each time a degraded engine needs to be serviced, overhauled, or replaced. To avoid having to take an entire system offline each time a single engine needs overhauling or replacing, a multi-engine system may replace all the engines while the system is offline, potentially wasting the useful life left in the other engines that do not necessarily need replacing.

SUMMARY

In one example, the disclosure is directed to an engine controller that includes at least one processor, and a memory storing instructions. The instructions, when executed, cause the at least one processor to: estimate a deterioration factor of a first engine from two or more engines that are configured to jointly provide mechanical power to a multi-engine power system, adjust, based on the deterioration factor of the first engine, a first amount of mechanical power being provided by the first engine to extend a service time of the first engine, and adjust, based on the first amount of mechanical power being provided by the first engine, a second amount of mechanical power being provided by a second engine from the two or more engines to compensate for the adjustment to the first amount of mechanical power.

In another example, the disclosure is directed to a method that includes estimating, by a controller of two or more engines of a multi-engine power system, a deterioration factor of a first engine from two or more engines that are configured to jointly provide mechanical power required by the multi-engine power system, and adjusting, by the controller, based on the deterioration factor of the first engine, a first amount of mechanical power being provided by the first engine to increase a service time of the first engine. The method further includes adjusting, by the controller, based on the first amount of mechanical power being provided by the first engine, a second amount of mechanical power being provided by a second engine from the two or more engines to compensate for the adjustment to the first amount of mechanical power.

In yet another example, the disclosure is directed to a multi-engine power system that includes at least a first engine and a second engine configured to jointly provided mechanical power to the multi-engine power system, and a controller. The controller is configured to: estimate a deterioration factor of the first engine, adjust, based on the deterioration factor of the first engine, a first amount of mechanical power being provided by the first engine to increase a service time of the first engine, and adjust, based on the first amount of mechanical power being provided by the first engine, a second amount of mechanical power being provided by the second engine to compensate for the adjustment to the first amount of mechanical power.

The details of one or more examples are set forth in the accompanying drawings and the description below. Other features, objects, and advantages of the disclosure will be apparent from the description and drawings, and from the claims.

DETAILED DESCRIPTION

In general, techniques and circuits of this disclosure may enable an engine controller to individually adjust the mechanical power being provided by two or more engines of a multi-engine system to adjust the degradation rate of at least one of the engines while meeting mechanical power requirements of the system. For example, a multi-engine system, such as an aircraft, may rely on mechanical power provided by two or more engines (e.g., turbine engines, piston engines, etc.) to provide thrust, to be converted to electrical power, or the like. An example controller of the multi-engine system may dynamically manage the mechanical power output from each of the two or more engines not only to meet the mechanical power requirements of the system, but also to directly affect deterioration of mechanical components of, and therefore degradation in performance of, at least one of the engines. In other words, unlike other multi-engine system controllers that manage engine output primarily to satisfy electrical or mechanical power requirements of the system, the example controller described herein also considers engine degradation when determining how much mechanical power to extract from each engine at any given time.

For instance, the example controller may request different amounts of mechanical power from two different engines depending on the degradation levels of the two engines. The controller may keep the total power produced by the two engines the same, while commanding the better preforming (or less deteriorated) engine of the two to produce more power and commanding the worse performing (or more deteriorated) engine of the two to produce less power. The power differential between the two engines may depend on the difference in degradation between them.

In this way, the example controller may vary mechanical power produced by at least one engine in the system as a way to manage the relative deterioration and degradation of each engine in the system, extend the service time or even end-of-life of a more deteriorated engine, or cause multiple engines to degrade a different rates so as to be ready for service at approximately the same time. In addition, since a better performing engine (e.g., an engine that produces more mechanical power for similar degradation rate) typically consumes less fuel than a worse performing engine, a multi-engine system that relies on an example controller described herein may experience better overall fuel flow since the example controller may cause the better performing engine to produce more of the mechanical power. As such, a multi-engine system that relies on the example controller may experience less down time, have a greater maintenance-free operating period, potentially consume less fuel, and therefore, cost less to operate and maintain as compared to other systems.

Figure 1:
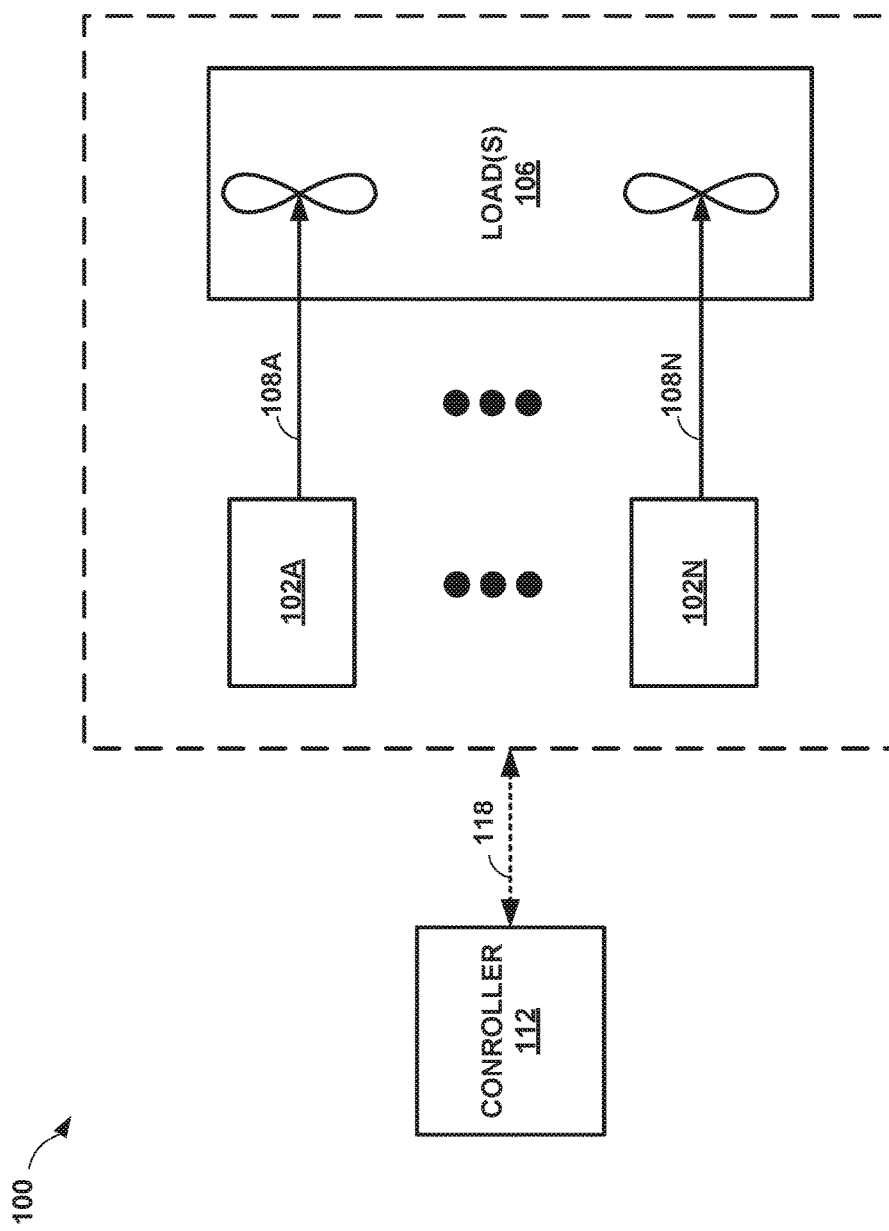
FIG. 1 is a conceptual diagram illustrating an example multi-engine system configured to independently adjust the mechanical power being provided by multiple engines to balance the respective degradation levels of each of the engines, in accordance with one or more aspects of the present disclosure.

FIG. 1 is a conceptual diagram illustrating an example multi-engine system 100 configured to adjust the mechanical power being provided by multiple engines to balance the respective degradation levels of each of the engines, in accordance with one or more aspects of the present disclosure. Multi-engine system 100 (also referred to simply as "system 100") represents any multi-engine system relies on two or more engines for mechanical power. For ease of description, system 100 is described primarily as being part of an aircraft, such as a fixed-wing aircraft, rotor-craft, tilt-rotor craft or any other type of aircraft. However, many other examples of system 100 exist. For example, system 100 may be part of a mechanical power system of a marine craft, space craft, or other vehicle, a power plant for driving generators for powering a power grid or other electrical system, or any other type of mechanical power system that relies on the mechanical output from multiple engines to perform work.

System 100 includes engines 102A-102N (collectively "engines 102"), mechanical shafts 108A-108N (collectively "shafts 108"), one or more loads 106, and controller 112. Controller 112 is communicatively coupled to some or all of components 102, 106, and 108 via communication link 118. In other examples, system 100 may include additional or fewer components than those shown including a single communication link 118 or multiple, communication links communicatively coupling controller 112 to the various components of system 100.

Loads 106 represent any number of components (e.g., mechanical or electrical) that rely on mechanical power produced by a multi-engine power system such as system 100. For example, when system 100 is part of an aircraft, load 106 may include any quantity electrical machines (e.g., alternators, generators, or other electrical machines) for powering lighting components, avionics components, pumps, communication systems, computer systems, display systems, cabin comfort systems, or any other electrical component or subsystem of the aircraft. Load 106 may include any quantity of mechanical propulsion components (e.g., shafts, propellers, gearboxes, or other mechanical components) that rely on mechanical power from a multiple engines to perform work. As one example, loads 106 are shown in FIG. 1 as propellers, however loads 106 may include any type of and any quantity of mechanical load that derives mechanical power from one or more engines such as engines 102.

Loads 106 are shown in FIG. 1 as being mechanically coupled to engines 102 via mechanical shafts 108. When engine 102A is running, engine 102A may output mechanical power to loads 106 by spinning mechanical shaft 108A. Similarly, when engine 102N is running, engine 102N may output mechanical power to loads 106 by spinning mechanical shaft 108N.

Each of engines 102 represents any mechanical power source that is configured to produce mechanical power. In some examples, engines 102 may produce mechanical power for loads 106, for instance, for providing thrust or power for one or more propellers, fans, fuel pumps, hydraulic pumps and other equipment associated with load 106. As shown in FIG. 1, each of engines 102 may be mechanically coupled to a propeller or fan (e.g., a propulsor) for producing thrust. Examples of engines 102 include gas turbine engines, internal combustion engines, such as piston or rotary engines, or any other type of engine that mechanically drives one or more mechanical shafts 108. The mechanical output from each of engines 102 can be individually controlled by controller 112. For example, controller 112 may control the throttle of engine 102A to control the speed at which engine 102A spins mechanical shaft 108A independently of the throttle setting controller 112 commands to engine 102N to control the speed with which engine 102N spins mechanical shaft 108N.

In some examples, for instance, on a multi-engine aircraft, each engine 102 may include multiple shafts 108. For example, in examples in which engine 102 are gas turbine engines, often times each of engines 102 may have two shafts, a high pressure shaft and a low pressure shaft. Load 106 may be coupled to one or both shafts 108 to receive mechanical power being produced by engines 102.

In any case, by load 106 consuming mechanical power from engines 102, load 106 is extracting mechanical power from the thermodynamic cycles of engines 102. This mechanical power extraction by load 106 will affect the thermodynamic cycle of each of engines 102 thereby impacting fuel consumption, operating temperatures, and pressures in each of engines 102.

Each of engines 102 may be at a different stage in its respective service time or life cycle when that engine is installed in system 100. For example, engine 102N may be been installed in system 100 as a new engine, hours, months or even years before engine 102A is installed as a new engine in system 100. Therefore, when engine 102A is installed in system 100, engine 102A may inherently have a longer remaining operating life as compared to engine 102N since engine 102N was installed and ran for some time prior to engine 102A being installed. Or in some examples, engines 102A and 102N may be installed as new engines in system 100 at the same time, but engine 102N may incur damage or experience a failure condition (e.g., during combat, training, or in an accident) and as a result, have a shorter respective service time or life cycle as compared to engine 102A that did not incur damage or experience the failure condition.

Even if each of engines 102 are at the same stage in their respective service times or operating life cycles when installed in system 100, and each of engines 102 has similar power and torque ratings, each of engines 102 is unique and the respective performance of each may degrade at different rates over time. For example, due to variations in manufacturing conditions, operating conditions, environmental conditions, and other factors, the mechanical components of engine 102A may deteriorate faster than the mechanical components of engine 102N. Engine 102A may therefore be required to work harder (e.g., run faster, hotter, etc.) during its life to produce the same amount of mechanical power as engine 102N. Eventually, over time, even if both engines 102A and 102N are controlled so as to produce the same or similar amounts of mechanical power, engines 102A and 102N may reach their respective end of life or service time, at different points in time. For example, engine 102A may degrade or deteriorate more quickly than engine 102N and need to be maintained, overhauled, and/or replaced before engine 102N needs similar servicing.

In general, controller 112 may control the amount of mechanical power being produced by each of engines 102 for use by load 106 and the rest of system 100. Controller 112 may adjust the mechanical power being provided by engines 102 to manage the rate of degradation of at least one of engines 102 while meeting mechanical power requirements of system 100.

Controller 112 is shown in FIG. 1 as being operationally coupled to each of components 102, 106, and 108 via communication link 118, which may be one or more wired or wireless communication links. In some examples, controller 112 may be operationally coupled to a subset of components 102, 106, and 108. Controller 112 may exchange information across communication link 118 between components 102, 106, and 108, and any other components of system 100 to cause engines 102 to distribute, and refrain from distributing, mechanical power to load 106. In some instances, controller 112 may communicate via communication link 118 with other control modules of system 100 (not shown in FIG. 1), such as respective engine control modules associated with engines 102, to vary or manage the mechanical power being produced for load 106.

Controller 112 may comprise any suitable arrangement of hardware, software, firmware, or any combination thereof, to perform the techniques attributed to controller 112 herein. Examples of controller 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 121 includes software or firmware, controller 112 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed).

While controller 112 may coordinate mechanical power production and degradation of engines 102 to meet overall performance requirements (e.g., total electrical, mechanical, and/or thrust power) of system 100, controller 112 may also control engines 102 to coordinate deterioration or degradation in performance of engines 102 as a way to coordinate the respective service life of each of engines 102. For example, controller 112 may control engines 102 to ensure a total amount of thrust or particular fuel consumption is being provided by engines 102 while at the same time request a different amount of power from each of engines 102 depending on their respective degradation levels. For instance, controller 112 may request less power from a more degraded engine 102 and to compensate in the total system level reduction in power, controller 112 may request more power from a lightly degraded engine 102. By controlling engines 102 based on the respective deterioration levels of each of engines 102, controller 112 may coordinate the respective service times of engines 102.

As used herein, the term "service time" of an engine corresponds to any milestone in the life cycle of an engine at which it may be desirable to replace, perform maintenance, overhaul, repair, or otherwise service the engine. For example, the service time of an engine may correspond to the end-of-life of the engine or a maintenance milestone of the engine.

The service time of an engine may depend on a variety of factors, including variations in: manufacturing conditions of the engine and components thereof (e.g., variations in quality, humidity, materials, etc.), operating stresses (e.g., throttle settings, torque settings, operating temperatures, acceleration loads, other stresses, etc.) environmental conditions (e.g., altitude variations, external temperature variations, humidity variations, etc.) and other factors (e.g., bird strikes, combat related damage, civilian accidents, maintenance or operator error, etc.).

The service time of an engine may occur naturally (e.g., through regular use) or occur suddenly (e.g., after a failure event) and may change over time. For instance, the service time of an engine that was previously set to occur at some future time may change and correspond to an earlier time (e.g., due to stressing the engine, bird strike, combat event, accident, etc.). In some examples, the service time of an engine that was previously set to occur at some future time may change and become immediate, corresponding to a current time (e.g., due to a catastrophic failure event from combat, accident, over-stressing, other failure condition).

Controller 112 may operate with an objective of managing deterioration levels of engines 102 such that each of engines 102 reaches a respective service time at approximately the same time. For example, controller 112 may extract mechanical power from each engine 102 differently, as needed, to decrease the rate of degradation of the most degraded engine 102 (less electrical power extraction) while increasing the rate of degradation of the least degraded engines 102 (more electrical power extraction). By adjusting mechanical power extraction from engines 102 based on deterioration levels of engines 102, controller 112 may minimize the frequency with which system 100 goes down for engine maintenance and in some examples, may extend the amount of time between engine service times. In addition, by extracting more mechanical power from a less deteriorated engine 102 to compensate for a reduction in mechanical output from a greater deteriorated engine 102, controller 112 may cause system 100 to have an overall reduced amount of fuel flow. As such, the example multi-engine system may experience less down time for engine maintenance and cost less to maintain as compared to other systems.

Figure 2:
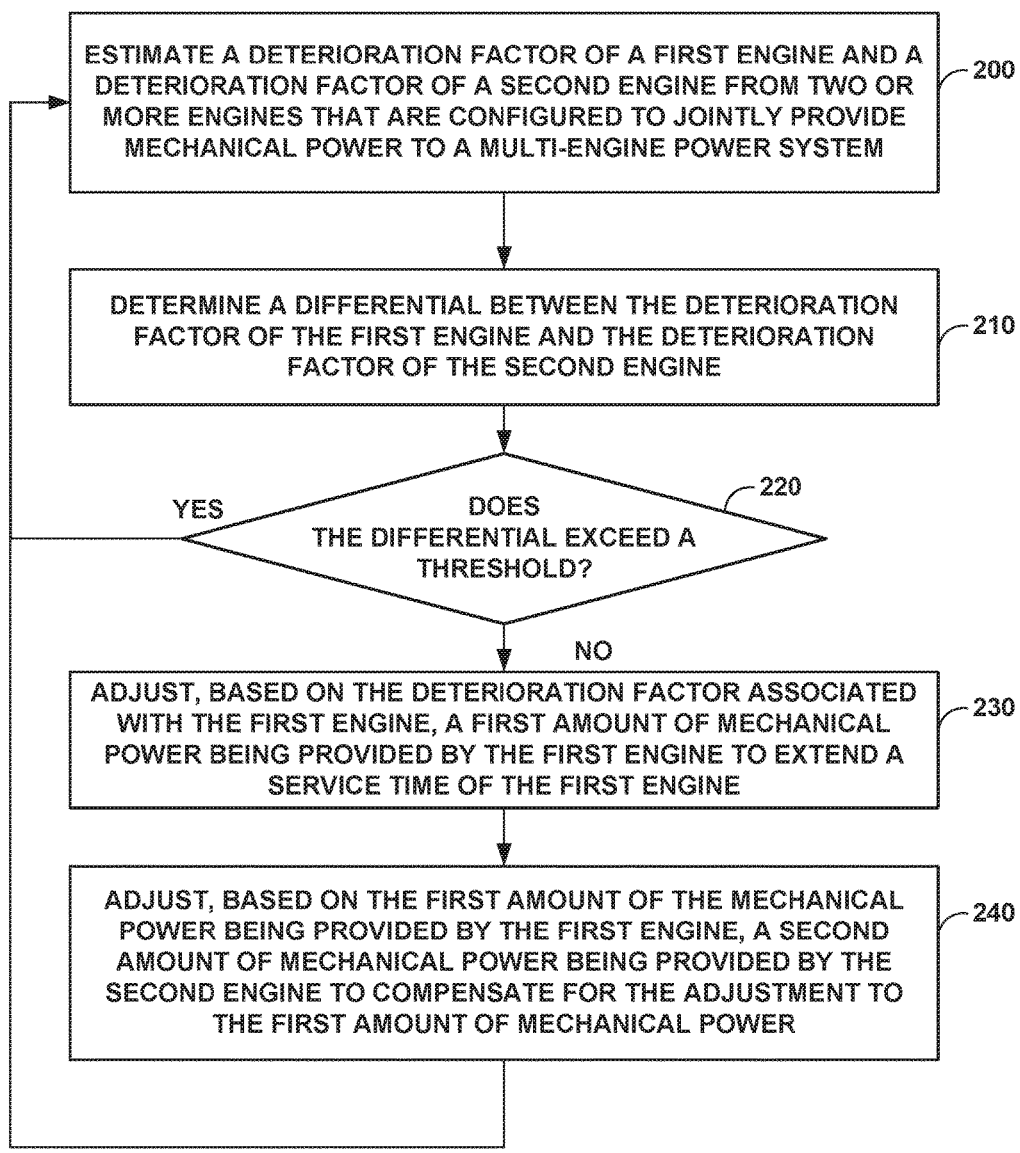
FIG. 2 is a flow chart illustrating example operations performed by an example controller configured to individually adjust the mechanical power being provided by multiple engines to balance the respective degradation levels of each of the engines, in accordance with one or more aspects of the present disclosure.

FIG. 2 is a flow chart illustrating example operations performed by an example controller configured to adjust the mechanical power being provided by multiple engines to balance the respective degradation levels of each of the engines, in accordance with one or more aspects of the present disclosure. FIG. 2 is described in the context of the components of system 100 of FIG. 1, although the technique of FIG. 2 may be implemented by other systems including additional or fewer components. Controller 112 may perform additional or fewer operations than those shown in FIG. 2a and may perform the operations shown in FIG. 2 in any order.

As shown in FIG. 2, in accordance with techniques of this disclosure, controller 112 may estimate a deterioration factor of a first engine and a deterioration factor of a second engine from two or more engines that are configured to jointly provide mechanical power to a multi-engine power system (200). For example, controller 112 may communicate via link 118 with load 106 and the various other systems and subsystems associated with system 100 to determine the total mechanical power required from engines 102. Controller 112 may determine the total mechanical power to be provided to load 106 and system 100 so that controller 112 can cause engines 102 to jointly provide sufficient mechanical power to system 100.

While controller 112 causes engines 102 to jointly provide mechanical power that is sufficient to power load 106, controller 112 may monitor one or more operating parameters associated with each of engines 102 in order to estimate respective deterioration factors associated with each of engines 102. For example, controller 112 may monitor operating temperatures, fuel consumption rates, shaft speeds, hours of usage, pressures, amounts of electrical and mechanical output, and other operating parameters associated with engines 102 to obtain information about the respective degradation levels of each of engines 102 in order to quantify an amount of remaining useful life associated with each of engines 102.

Controller 112 may measure the one or more respective operating parameters associated with engines 102 over prior time durations (e.g., one or more minutes, hours, and/or days of prior operation) and input the measured operating parameters into a model for estimating, predicting, or projecting the amount of degradation of each of engines 102 or the amount of useful life left in each of engines 102 until its next service time. For example, controller 112 may rely on a model that is built from prior engine data collected over time for a particular one of engines 102, or from other, similar engines. The model may project the current performance of a particular engine onto a degradation glide slope that the model uses to estimate an end-of-life, or other service time of that particular engine. The model may determine a deterioration factor (e.g., a percentage, a score, etc.) that indicates an amount of degradation or amount of operating life that has been used up by a particular one of engines 102, before that particular one of engines 102 will fail, need replacing, or otherwise need servicing. Controller 112 may rely on look up tables, functions, or other modules (in addition to or instead of a model) to determine the deterioration factor of a particular one of engines 102.

Unlike other engine balancing control systems, the example multi-engine system may rely on averaging techniques and/or trends analysis in the deterioration data to determine the best mechanical power output to extract from each engine at various times. In addition, unlike other engine balancing control systems, the example multi-engine system may perform engine-life management optimization rather than engine-limit avoidance. In other words, rather than simply control engines to avoid exceeding their mechanical power limits, the example multi-engine system may perform trend analysis of engine data to control when and how fast an engine reaches the end of its useful life.

Although primarily described herein as indicating an engine's amount (e.g., percentage) of degradation or an amount of spent or consumed useful life, a deterioration factor in some examples could instead indicate an amount of life that is left in an engine. In cases where the deterioration factor indicates an engine's amount of degradation or amount of spent or consumed useful life, reducing mechanical output from that engine may reduce the rate of increase of the deterioration factor of the engine. Whereas, in cases where the deterioration factor indicates and engine's remaining useful life, reducing mechanical output from that engine may reduce the rate of decrease of the deterioration factor of the engine.

Controller 112 may input one or more operational parameters of engines 102A into the model, and in response, the model may output a deterioration factor of engines 102A. Similarly, controller 112 may input one or more operational parameters of engines 102N into the model, and in response, the model may output a deterioration factor of engines 102N. For instance, the model may output a deterioration factor of engine 102A that corresponds to a percentage of a total amount of degradation of engine 102A before engine 102A requires servicing or a total amount of degradation of engine 102A since engine 102A was last serviced. Similarly, the model may output a deterioration factor of engine 102N that corresponds to a percentage of a total amount of degradation of engine 102N before engine 102N requires servicing or a total amount of degradation of engine 102N since engine 102N was last serviced.

Controller 112 may rely on various sensors embedded within engines 102 and other parts of system 100 to determine the deterioration factor of each of engines 102. For example, controller 112 may communicate with speedometers, tachometers, accelerometers, thermometers, pressure sensors, and the like to determine whether the performance of each of engines 102 has degraded, and if so, by how much.

In some examples, the model relied on by controller 112 may equate turbine temperature at a certain power to a deterioration factor. For instance, if the temperature of engine 102A is higher than expected for a certain commanded output, the model may determine that by running hot, engine 102A is degraded. The level of temperature increase over expected may be proportional to the amount of degradation of the engine.

Controller 112 may measure variations in fuel flow to achieve certain power as indicators of a deterioration factor of one of engines 102. For example, controller 112 may determine that a higher than expected rate of fuel burn for a particular power setting indicates that a particular engine 102 is more degraded than a different engine that burns less fuel for the same particular power setting.

Similar to temperature and fuel flow, controller 112 may determine a deterioration factor of any one of engines 102 based on shaft speed of that particular one of engines 102 to achieve certain power output. For example, controller 112 may determine that a higher than expected shaft speed of shaft 108A for a particular power setting indicates that engine 102A is more degraded than engine 102N which spins shaft 108N at a lower shaft speed for the same particular power setting.

Controller 112 may determine a differential between the deterioration factor of the first engine and the deterioration factor of the second engine (210). For example, controller 112 may refrain from balancing the service times of two or more engines 102 if the deterioration factors are too far apart (e.g., the difference in deterioration factors exceeds a threshold) and only coordinate the service times if the deterioration factors are somewhat similar (e.g., the difference in deterioration factors is less than the threshold).

Controller 112 may determine whether the differential exceeds a threshold (220). For instance, controller 112 may refrain from coordinating service times if engine 102A is greatly deteriorated (e.g., having degraded by 80% and having only 20% remaining life) and engine 102N is less deteriorated (e.g., having degraded by only 10% and still having 90% remaining life) causing the differential between deterioration factors of engines 102A and 102N to be high (e.g., approximately 70%). On the other hand, if engine 102A is somewhat deteriorated (e.g., having degraded 50% and having 50% remaining life), and engine 102N is less deteriorated (e.g., having degraded 80% and only having 20% remaining life), causing the differential between deterioration factors of engines 102A and 102N to be approximately 30%, controller 112 may coordinate services times of engines 102A and 102N.

Responsive to determining that the differential exceeds a threshold (220, YES path), controller 112 may refrain from adjusting the first amount of mechanical power being provided by the first engine. For example, controller 112 may avoid adjusting the mechanical power being provided by engines 102A and 102N to balance service times if the difference in deterioration factors is too great (e.g., greater than 50%).

Conversely, controller 112 may adjust the first amount of mechanical power being provided by the first engine (230) in response to determining that the differential does not exceed the threshold (220, NO path) and may adjust, based on the first amount of mechanical power being provided by the first engine, a second amount of mechanical power being provided by the second engine to compensate for the adjustment to the first amount of mechanical power (240). For example, controller 112 may decrease the amount of mechanical power being provided by engine 102A to decrease a rate of change in the deterioration factor of engine 102A (e.g., to extend the service life of engine 102A) or may increase the amount of mechanical power being provided by engine 102A to increase a rate of change in the deterioration factor of the engine 102A (e.g., to shorten the service life of engine 102A). In any case, whether controller 112 increases or decreases the power output from engine 102A, controller 112 may adjust the power output of engine 102N to compensate for the adjustment to 102A such that system 100 continues to receive the required amount of mechanical power form engines 102. In other words, if controller 112 decreases the power output from engine 102A by some amount, controller 112 may increase the power output from engine 102N by a similar amount.

In some examples, controller 112 may adjust the amount of mechanical power being provided by engine 102A in response to determining a rate of change in the deterioration factor of engine 102A exceeds a rate of change in a deterioration factor of engine 102N. Said differently, controller 112 may perform operations 200-240 in response to determining that engine 102A may be deteriorating faster than engine 102N which causes the deterioration factor of engine 102A to increase more rapidly than deterioration factor of engine 102N. For example, while controller 112 may estimate the deterioration factors of engines 102A and 102N to be approximately 50%, controller 112 may determine that the deterioration factor of engine 102A suddenly increases to 90% (e.g., after suffering from catastrophic component failure, combat damage, bird strike, or experiencing some other failure condition) while the deterioration factor of engine 102N only increases slightly above 50%. Controller 112 may determine that the sudden change in deterioration of one engine but not the other requires management to extend the service life of all of engines 102.

While the above example has been described from the perspective of engine 102A, similar operations may be performed against engine 102N or any other one of engines 102. For example, controller 112 may adjust the amount of mechanical power being provided by engine 102A in response to detecting a change in the deterioration factor of engine 102N. For instance, while controller 112 may estimate the deterioration factors of engines 102A and 102N to be approximately 50%, controller 112 may determine that the deterioration factor of engine 102N suddenly increases to 90% while the deterioration factor of engine 102A continues to remain at approximately 50%.

Although in some examples, controller 112 may adjust mechanical output from engines 102 to extend the service life of one or more of engines 102, in other instances, controller 112 may deliberately burn up or shorten the service time of one of engines 102 (e.g., a good engine) to match the service life of that engine 102 with a badly deteriorated engine 102. For example, system 100 may experience a failure condition (e.g., due to damage from combat, damage from a bird strike, or some other failure condition) causing engine 102A to change from having a deterioration factor of 50% to having a deterioration factor of 90%. To prevent engine 102A from deteriorating further, controller 112 may dramatically increase the power being commanded from engine 102N to cause the deterioration factor of engine 102N to catch-up with the deterioration factor of engine 102A. While holding, or at least minimizing the increase in the deterioration factor of engine 102A beyond 90%, controller 112 may control the power output from engine 102N to cause the deterioration factor of engine 102N to increase from 50% to 90% even though engine 102N did not experience the failure condition that engine 102A experienced.

Figure 3:
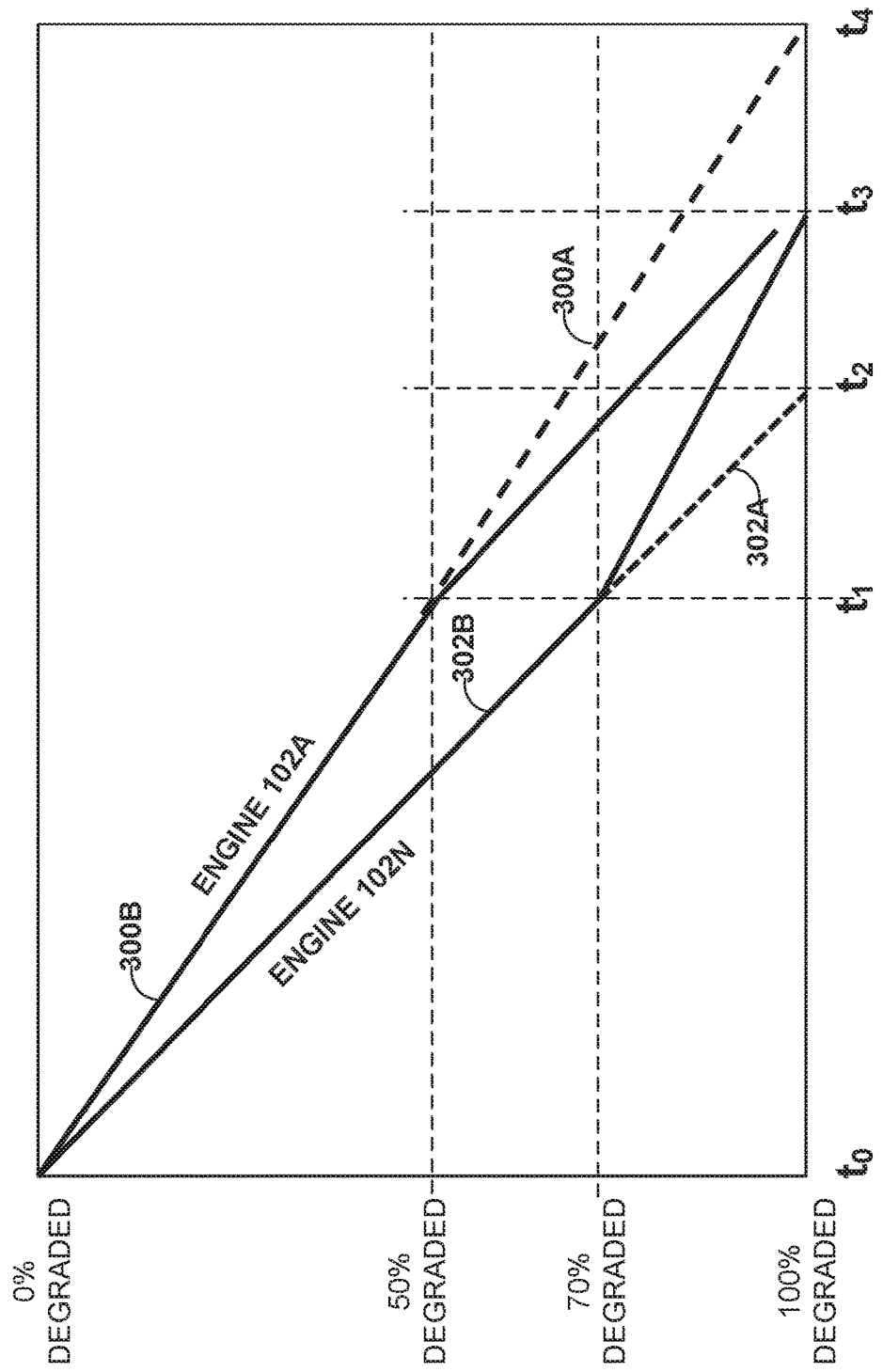
FIG. 3 is a conceptual diagram illustrating degradation rates of two different engines of an example multi-engine system that is configured to independently adjust the mechanical power being provided by multiple engines to balance the respective degradation levels of each of the engines, in accordance with one or more aspects of the present disclosure.

FIG. 3 is a conceptual diagram illustrating degradation rates of two different engines of an example multi-engine system that is configured to adjust the mechanical power being provided by multiple engines to balance the respective degradation levels of each of the engines, in accordance with one or more aspects of the present disclosure. FIG. 3 is described below in the context of system 100 of FIG. 1 as well as operations 200-240 of FIG. 2.

FIG. 3 includes degradation glide slopes 300A and 300B of engine 102A and degradation glide slopes 302A and 302B of engine 102N. As shown in FIG. 3, both engines 102A and 102N are "100% healthy" at time t0 or at least at the same degradation level. At time t0, controller 112 may determine that both engines 102A and 102N have approximately the same, respective deterioration factors that correspond to approximately 0% indicating that neither of engines 102A or 102N has degraded. In some cases, engines 102A and 102N may be newly installed engines of system 100, newly overhauled, etc.

In any case, during operational use, engine 102N may degrade faster than engine 102A. For example, as illustrated by a comparison between degradation glide slopes 300A and 302A between times t0 and t1, either due to manufacturing differences or other characteristics that make engine 102A unique from engine 102N, engine 102N may degrade faster than engine 102A causing the deterioration factor of engine 102A to increase at a faster rate than the rate of increase of the deterioration factor of engine 102N. At time t1, controller 112 may estimate that engine 102A has a deterioration factor of 50% whereas engine 102N has a deterioration factor of 70% and if left unchecked, engine 102N will degrade to a 100% deterioration factor at time t2 and engine 102A will degrade to a 100% deterioration factor at time t4.

Rather than continue to cause engines 102A and 102N to evenly split the power required by system 100, controller 112 may alter its mechanical power control scheme associated with engines 102 to compensate for the differences in degradation glide slopes 300A and 302A, and to coordinate the service times of engines 102A and 102N. For example, controller 112 may increase the amount of mechanical power being extracted from engine 102A so as to increase the rate at which the deterioration factor of engine 102A increases, thereby causing engine 102A to degrade faster and according to degradation glideslope 300B. Controller 112 may decrease the amount of mechanical power being extracted from engine 102N so as to cause engine 102N to degrade slower and according to degradation glideslope 302B thereby decreasing the rate at which the deterioration factor of engine 102N increases. In this way, controller 112 may cause engines 102A and 102N to continue to satisfy the mechanical power needs of system 100 while causing engines 102A and 102N to reach their respective service times at approximately the same time (e.g., at time t3).

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An engine controller comprising:
   at least one processor; and
   a memory storing instructions that, when executed, cause the at least one processor to:
      estimate a deterioration factor of a first engine from two or more engines that are configured to jointly provide mechanical power to a multi-engine power system;
      estimate a deterioration factor of a second engine from the two or more engines;
      determine a differential between the deterioration factor of the first engine and the deterioration factor of the second engine;
      responsive to determining that the differential does not exceed a threshold:
         adjust, based on the deterioration factor of the first engine, a first amount of mechanical power being provided by the first engine to extend a service time of the first engine; and
         adjust, based on the first amount of mechanical power being provided by the first engine, a second amount of mechanical power being provided by the second engine to compensate for the adjustment to the first amount of mechanical power.

2. The engine controller of claim 1, wherein the instructions, when executed, further cause the at least one processor to adjust the first amount of mechanical power being provided by the first engine to adjust a rate of change of the deterioration factor of the first engine.

3. The engine controller of claim 2, wherein the instructions, when executed, further cause the at least one processor to:
   decrease the first amount of mechanical power being provided by the first engine to decrease the rate of change in the deterioration factor of the first engine; and increase the first amount of mechanical power being provided by the first engine to increase the rate of change in the deterioration factor of the first engine.

4. The engine controller of claim 1, wherein the instructions, when executed, further cause the at least one processor to:
adjust, based on the deterioration factor of the second engine, the second amount of mechanical power being provided by the second engine to extend the service time of the second engine; and
adjust, based on the second amount of mechanical power being provided by the second engine, the first amount of mechanical power being provided by the first engine to compensate for the adjustment to the second amount of mechanical power.

5. The engine controller of claim 1, wherein the instructions, when executed, further cause the at least one processor to:
monitor one or more operating parameters of the first engine; and
estimate, based on the one or more operating parameters of the first engine, the deterioration factor of the first engine.

6. The engine controller of claim 5, wherein the one or more operating parameters of the first engine includes at least one of temperature of the first engine, fuel consumption of the first engine, and shaft speed of the first engine.

7. The engine controller of claim 1, wherein the instructions, when executed, further cause the at least one processor to:
responsive to determining that the differential exceeds a threshold, refrain from adjusting the first amount of mechanical power being provided by the first engine.

8. The engine controller of claim 1, wherein the deterioration factor of the first engine corresponds to a percentage of a total amount of degradation of the first engine.

9. The engine controller of claim 1, wherein the instructions, when executed, further cause the at least one processor to:
adjust the first amount of mechanical power being provided by the first engine to increase a rate of change in the deterioration factor of the first engine to shorten the service time of the first engine; or
adjust the second amount of mechanical power being provided by the second engine to increase a rate of change in the deterioration factor of the second engine to shorten a service time of the second engine.

10. A method comprising:
estimating, by a controller of two or more engines of a multi-engine power system, a deterioration factor of a first engine from two or more engines that are configured to jointly provide mechanical power required by the multi-engine power system;
estimating, by the controller, a deterioration factor of a second engine from the two or more engines;
determining, by the controller, a differential between the deterioration factor of the first engine and the deterioration factor of the second engine;
responsive to determining that the differential does not exceed a threshold:
adjusting, by the controller, based on the deterioration factor of the first engine, a first amount of mechanical power being provided by the first engine to increase a service time of the first engine; and
adjusting, by the controller, based on the first amount of mechanical power being provided by the first engine, a second amount of mechanical power being provided by a second engine from the two or more engines to compensate for the adjustment to the first amount of mechanical power.

11. The method of claim 10, further comprising:
adjusting, by the controller, the first amount of mechanical power being provided by the first engine to adjust a rate of change in the deterioration factor of the first engine.

12. The method of claim 10, further comprising:
responsive to determining that the differential exceeds a threshold, refraining, by the controller, from adjusting the first amount of mechanical power being provided by the first engine.

13. The method of claim 10, further comprising:
monitoring, by the controller, one or more operating parameters of the first engine; and
estimating, by the controller, based on the one or more operating parameters of the first engine, the deterioration factor of the first engine.

14. A multi-engine power system comprising:
at least a first engine and a second engine configured to jointly provide mechanical power to the multi-engine power system; and
a controller configured to:
estimate a deterioration factor of the first engine;
estimate a deterioration factor of the second engine;
determine a differential between the deterioration factor of the first engine and the deterioration factor of the second engine;
responsive to determining that the differential does not exceed a threshold:
adjust, based on the deterioration factor of the first engine, a first amount of mechanical power being provided by the first engine to increase a service time of the first engine; and
adjust, based on the first amount of mechanical power being provided by the first engine, a second amount of mechanical power being provided by the second engine to compensate for the adjustment to the first amount of mechanical power.

15. The multi-engine power system of claim 14, wherein the controller is further configured to:
monitor one or more operating parameters of the first engine, wherein the one or more operating parameters of the first engine includes at least one of temperature of the first engine, fuel consumption of the first engine, and shaft speed of the first engine; and
estimate, based on the one or more operating parameters of the first engine, the deterioration factor of the first engine.

16. The multi-engine power system of claim 14, wherein the deterioration factor of the first engine corresponds to a percentage of a total amount of degradation of the first engine.

17. The multi-engine power system of claim 14, wherein the controller is further configured to adjust the first amount of mechanical power being provided by the first engine to increase a rate of change in the deterioration factor of the first engine or adjust the second amount of mechanical power being provided by the second engine to increase a rate of change in the deterioration factor of the second engine.

18. The multi-engine power system of claim 14, wherein the first and second engines are tilt-rotor engines of a tilt-rotor aircraft.

* * * * *

UNITED STATES PATENT AND TRADEMARK OFFICE
CERTIFICATE OF CORRECTION

PATENT NO. : 10,442,544 B2  
APPLICATION NO. : 15/586136  
DATED : October 15, 2019  
INVENTOR(S) : Boyd et al.

Page 1 of 1

It is certified that error appears in the above-identified patent and that said Letters Patent is hereby corrected as shown below:

In the Specification

Column 1, Line 8: Insert the following paragraph:  
--STATEMENT REGARDING FEDERALLY SPONSORED RESEARCH OR DEVELOPMENT  
This invention was made with government support under Contract No. W911W6-14-2-0006 awarded by the Department of Defense. The government has certain rights in this invention.--

Signed and Sealed this  
Twenty-fourth Day of May, 2022

Katherine Kelly Vidal  
*Director of the United States Patent and Trademark Office*